(12) United States Patent
Goldenstein

(10) Patent No.: US 11,077,599 B2
(45) Date of Patent: Aug. 3, 2021

(54) CALIBRATING DEVICE AND METHOD FOR CALIBRATING A FILM TUBE

(71) Applicant: Windmöller & Hölscher KG, Lengerich (DE)

(72) Inventor: Jens Goldenstein, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 233 days.

(21) Appl. No.: 15/580,530

(22) PCT Filed: Jun. 8, 2016

(86) PCT No.: PCT/EP2016/063000
§ 371 (c)(1),
(2) Date: Dec. 7, 2017

(87) PCT Pub. No.: WO2016/198439
PCT Pub. Date: Dec. 15, 2016

(65) Prior Publication Data
US 2018/0178433 A1    Jun. 28, 2018

(30) Foreign Application Priority Data

Jun. 8, 2015 (DE) ...................... 10 2015 210 466.4

(51) Int. Cl.
*B29C 48/90* (2019.01)
*B29C 48/10* (2019.01)
(Continued)

(52) U.S. Cl.
CPC ............ *B29C 48/907* (2019.02); *B29C 48/10* (2019.02); *B29C 48/903* (2019.02);
(Continued)

(58) Field of Classification Search
CPC ... B29C 48/903; B29C 48/907; B29C 48/908; B29C 48/913
See application file for complete search history.

(56) References Cited

U.S. PATENT DOCUMENTS 3,622,657 A    11/1971  North et al.
3,663,134 A *   5/1972  Coquelin ................ B29C 35/16
                                                425/72.1
(Continued)

FOREIGN PATENT DOCUMENTS

DE        1937978 A1    4/1970
DE       10160321 A1    6/2003
(Continued)

OTHER PUBLICATIONS

PCT Notification of Transmittal of Translation of the International Preliminary Report of Patentability dated Dec. 14, 2017, issued for PCT Application No. PCT/EP2016/063000, as well as the English translation document, 7 pages.

*Primary Examiner* — Xiao S Zhao
*Assistant Examiner* — Nicholas J Chidiac
(74) *Attorney, Agent, or Firm* — Peter W. Schroen; Bret E. Field; Bozicevic, Field & Francis LLP

(57) ABSTRACT

The invention relates to a calibrating device and to a method for calibrating a film tube. An elastically deformable element (704) is secured to the sleeve (703) such that a fluid, in particular a gas, preferably air, can be introduced or discharged via a fluid connection such that a specific pressure P1 and/or a specific volume V1 is set in an area (708) enclosed by the sleeve and the elastically deformable element at a given temperature. Annular bodies (706) and (707) are arranged within the area (708), and a surface section of each annular body (706), (707) supports a respective region of the elastically deformable element (704). The elastically deformable element (704) regions which are supported by (Continued)

Figure 3:
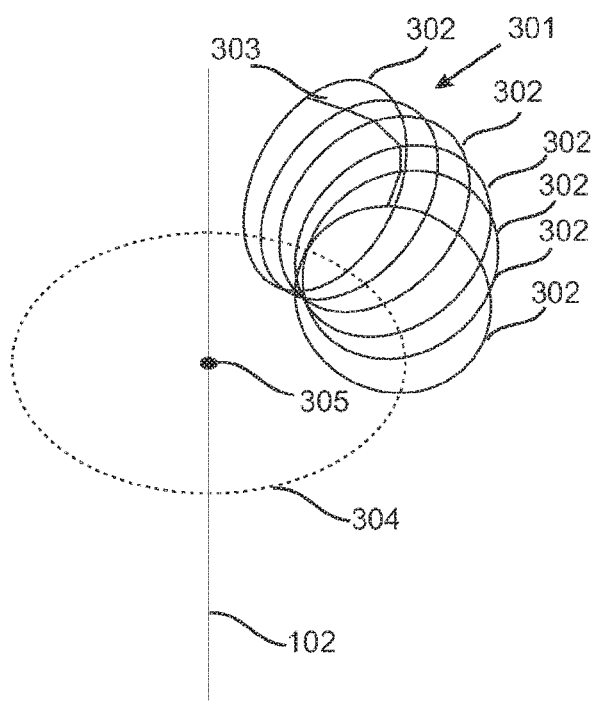

the annular bodies are located in the inlet region (711) and the outlet region (712) of the calibrating device for the film tube (713).

19 Claims, 7 Drawing Sheets

(51) Int. Cl.
  *B29C 48/92* (2019.01)
  *B29C 48/88* (2019.01)
  *B29C 55/28* (2006.01)
(52) U.S. Cl.
  CPC .......... *B29C 48/908* (2019.02); *B29C 48/913* (2019.02); *B29C 48/92* (2019.02); *B29C 55/28* (2013.01); *B29C 2948/92619* (2019.02); *B29C 2948/92923* (2019.02)

(56) References Cited

U.S. PATENT DOCUMENTS

| | | | | |
|---|---|---|---|---|
| 3,958,913 | A * | 5/1976 | Stangl | B29C 48/10 |
| | | | | 425/445 |
| 9,889,593 | B2 * | 2/2018 | Goldenstein | B29C 48/08 |
| 2009/0304840 | A1 * | 12/2009 | Frische | B29C 48/92 |
| | | | | 425/150 |
| 2013/0161852 | A1 * | 6/2013 | Goldenstein | B29D 23/00 |
| | | | | 264/40.1 |

FOREIGN PATENT DOCUMENTS

| | | |
|---|---|---|
| JP | S49-5739 B1 | 2/1974 |
| WO | WO2012032128 A1 | 3/2012 |
| WO | WO2012159233 A1 | 11/2012 |

* cited by examiner

Fig. 1: Prior Art
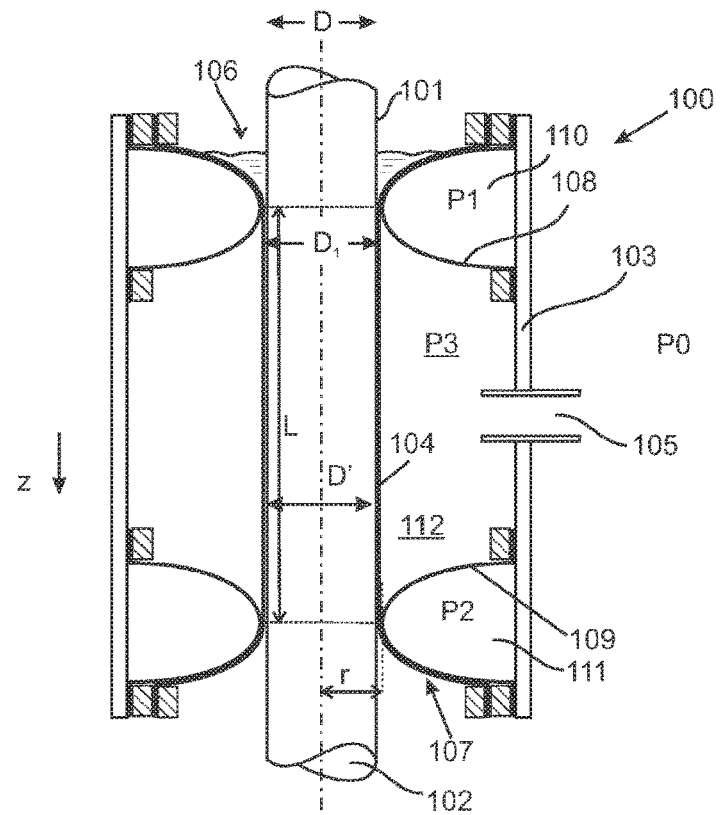
Fig. 2:
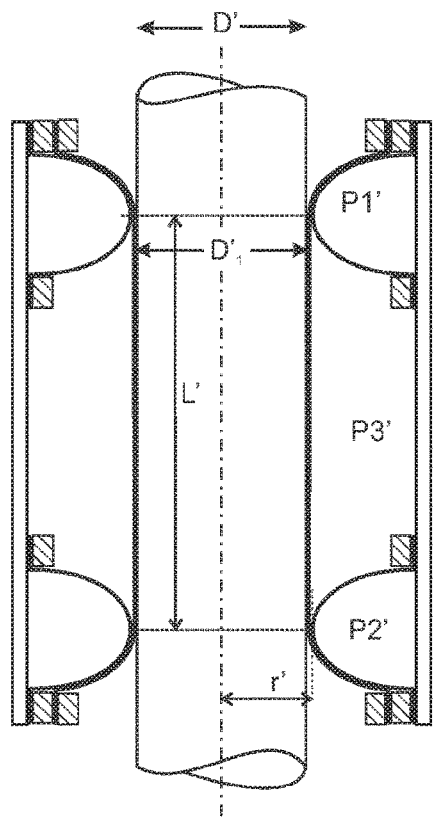

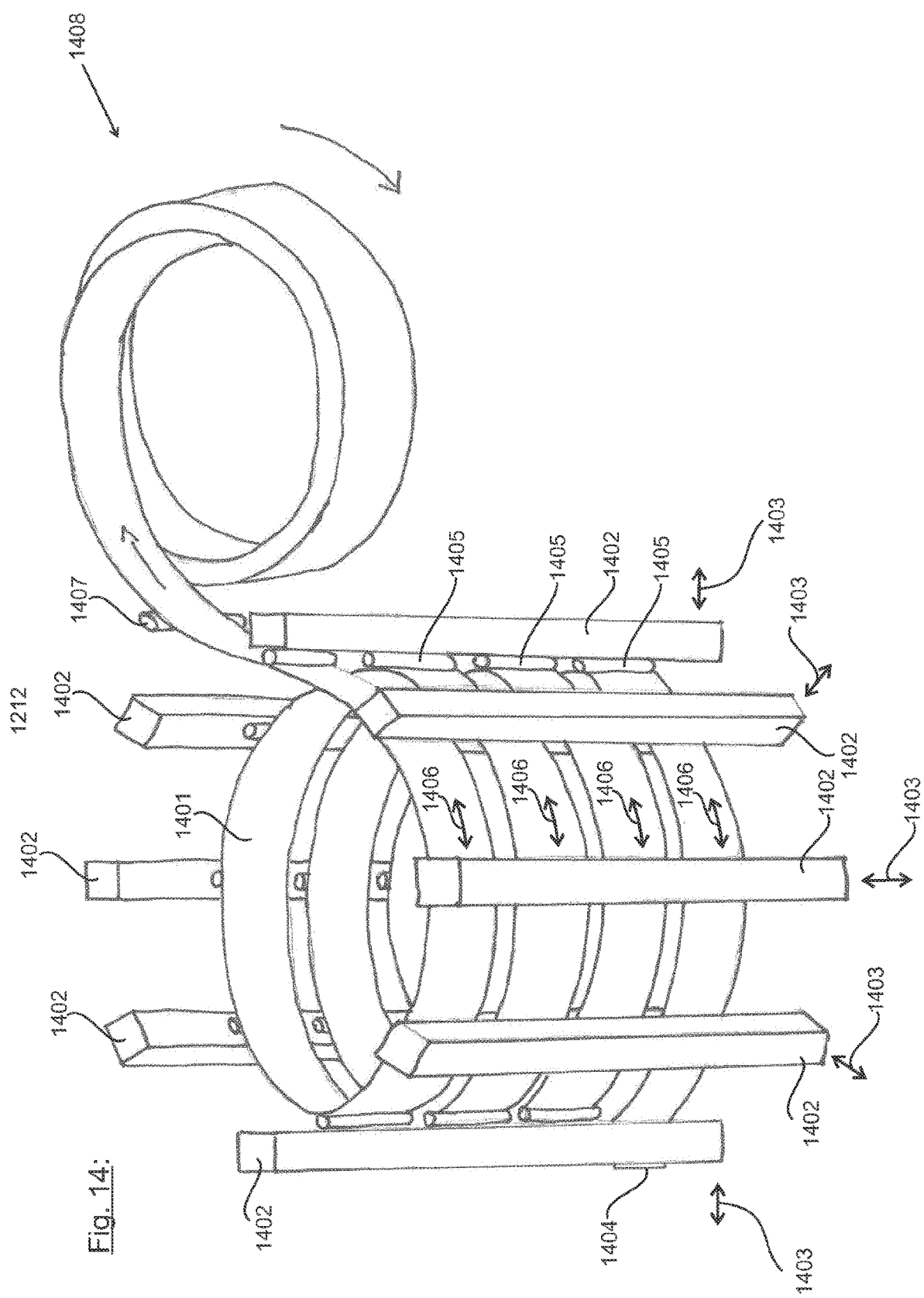

CALIBRATING DEVICE AND METHOD FOR CALIBRATING A FILM TUBE

The invention relates to a calibrating device and a method for calibrating a film tube.

A film tube that has just left the annual nozzle of a film tube unit, should be cooled off as quickly as possible. Firstly, a film tube can be produced more quickly through quicker cooling. Secondly, the cooling rate also has an effect on the properties of the film which ultimately is produced from the film tube. Particular material compositions of a film tube even require a particularly high cooling rate. To be able to manufacture a film with particular efficiency, additionally it is important to be able to adjust the diameter of the calibrating device.

Therefore, the object of the present invention is to produce a calibrating device and a method by which the above-mentioned requirements are able at least in part to be met.

The object is achieved through the features of claim 1.

Accordingly what is provided is a calibrating device for calibrating a film tube, which has an outer diameter, which is adjustable by a gas pressure, especially by an excess gas pressure, in the interior of the film tube, wherein at least one guidance element is provided, to which at least one guidance surface is assigned, which the outer surface of the film tube faces, and which limits the exterior diameter of the film tube and guides the film tube in a region which has a guidance length, wherein the distance of the guidance surface and/or of the guidance element to the axis of symmetry is alterable, wherein the film tube is guidable by the calibrating device in the direction of gravity, and wherein above, or in the inlet region of the at least one guidance element, a liquid reservoir is situated, wherein the liquid is able to be directed out of the liquid reservoir to the outer periphery of the film tube.

According to the invention, the film tube is adjustable in its diameter in that a gas, preferably air, is directed at an excess pressure into the interior of the film tube. By this a film bubble is produced, the diameter of which is determined so that the inner pressure is as great as the outer pressure and the forces that are applied to the already solidified film tube.

Additionally, according to the invention at least one guidance element is provided for guiding the film, which again limits the radial stretching of the film tube, in that it exerts a force acting inward on the hose. To the guidance element, at least one guidance surface is assigned which faces the outer side of the film tube. This guidance surface thus is in direct or indirect contact with the film tube. The guidance surface can be united with the guidance element, i.e. be attached to it, be configured as a single piece with the guidance element, or be a separate component. In the latter case, the guidance surface can extend over multiple guidance elements. The guidance element and/or the guidance surface make a guidance length available. What is to be understood by guidance length are the parts of the extension of the guidance element or of the guidance surface, which, as viewed in the transport direction of the film tube, run in essence parallel to the outer surface of the film tube.

To be able to adjust the diameter of the film tube, according to the invention provision is made that the guidance element can be altered in its position at least in the radial direction of the film tube. In other words, the film tube defines an axis of symmetry to which the film guidance element can be adjusted in its distance. This includes also the corresponding position alteration of the guidance surface. Preferably the calibrating device includes a stationary support device on which the guidance element is braced, but relative to which the guidance element is movable.

In the upper area of the calibration device, a liquid reservoir is provided. From this, a liquid can be emitted to the outer periphery of the film tube, so that it preferably is surrounded by a closed liquid film. In this the liquid carries out two important functions. For one, it lessens the friction between the guidance surface and the outer surface of the film tube, and for another it can withdraw heat from the film tube, so that a quicker cooling can be implemented. In this case, the film tube thus is in indirect contact with the guidance surface, in that between the two there still is the liquid. Water is preferred as the liquid, the supplying and handling of which is convenient.

In one especially preferred embodiment form, the guidance length is adjustable or constant, independent of the distance of the guidance surface and/or of the guidance element to the axis of symmetry. In other words, altering the distance of the guidance element from the axis of symmetry causes no change in the guidance length, because according to the invention this is constant. If solely a change in the said distance should lead to a change in the guidance length, then according to the invention the guidance length is adjustable, so that for example it can be adjusted back to the previous value, or to a desired value. The mechanisms and designs advantageous for this will be explained in greater detail in connection with the figures.

In another advantageous embodiment, provision is made that the at least one guidance element and/or the at least one guidance surface, as viewed in the transport direction, at the beginning of the calibrating device is configured with a cross section becoming narrower in the transport direction. Thus the narrowing cross section becomes something of a hopper in which the not-yet-fully-cooled film tube can be inserted in a gentle way into the calibrating device, without the film tube thereby being damaged. Particular advantages result in combination with the above-mentioned liquid reservoir, when the latter is located in this inlet region with a narrowing cross section. In the lower area of this inlet region, the liquid is subjected to a higher pressure, so that in a simple way it is able to be delivered to the outer periphery of the film tube, so that a liquid film forms between the calibrating device and film tube.

In an advantageous additional embodiment, the cross section of the inlet region is adjustable or constant, independent of the distance of the guidance surface and/or of the guidance element to the axis of symmetry. With calibrating devices known from prior art, the distance and the cross section are not adjustable in an independent way and means. Independence of adjustability of these two parameters (distance to the axis of symmetry and cross section of the inlet region) is desirable, because in this case, even with different distances to the axis of symmetry, film tubes with differing diameters but with the same or roughly equal quality can be manufactured. Among other things, the quality of the film tubes depends on the shape of the cross section of the inlet region. If this is optimally set, there results an optimal quality of the film tube.

It is advantageous if the inlet region, in cross section, at least partially has a circular-arc-shaped cross section. It is simple to create a partially circular-arc-shaped cross section, by for example generating this part of the cross section by a tube-shaped element. Additionally, a partially circular-arc-shaped cross section offers advantages in adjustability, since a circular-arc-shaped cross section can be maintained also with a change in the distance to the axis of symmetry.

Especially with a change in distance, the radius of the circular-arc-shaped cross section can be maintained.

In regard to the liquid reservoir, it is especially advantageous if a static liquid ring is provided in the inlet region for formation of the liquid reservoir. The liquid ring is produced by admitting the liquid into the inlet region, with the upper edge of the liquid ring (thus the liquid level) being able to be in or above the inlet region. The static formation of the liquid ring is attained by addition of liquid in an amount that is taken by the film tube. Thus it is important that the liquid level assume a constant height. For this a regulator can be provide which monitors the liquid level and if necessary makes corrections by increasing or reducing the feed of liquid. A constant height of the liquid level is advantageous to keep the cooling rate of the film tube constant. This results in a constant quality of the film tube over the entire time of production.

In one advantageous configuration of the invention-specific calibrating device, the at least one guidance element or at least a part of the totality of guidance elements, provides a cylindrical, barrel-shaped or conical region for the film tube. In this way the film tube can be set to a specific diameter, especially if a cylindrical region is prepared. A barrel-shaped expansion on the course of the calibrating device can also be advantageous, however, because in the expanded region the amount of liquid, and thus the cooling action, can be magnified. Also a conical region can be advantageous, especially if the diameter is reduced in the transport direction. With a diameter that declines in the transport direction, which is also applicable at least in part to a barrel-shaped region, the diameter of the film tube is stabilized in good fashion.

An embodiment of the invention is advantageous in which a plurality of guidance elements is present, which are adjustable in their distance to the axis of symmetry. Each individual guidance element can undergo this adjustment of distance. It is also conceivable, however, to have a joint adjustability in groups of guidance elements, wherein, within this group, the individual guidance elements can be connected to each other directly or indirectly, so that adjustment of one of the guidance elements can also cause the other guidance elements to be adjusted. One particular configuration of this version comprises just one group, i.e., all of the guidance elements are adjustable in common.

Additionally, it is advantageous if the at least one guidance element extends essentially parallel to the transport direction of the film tube. This means that its stretching in the peripheral direction is considerably smaller than the stretching in the transport direction of the tube. In this, "considerably smaller" means that the factor is smaller than a tenth. In other words, in this embodiment, as viewed over the periphery, a large number of guidance elements are provided, so that the guidance elements for guiding the tube form a polygon, which represents a circle as well as possible, i.e. with only minor deviation errors.

In one advantageous embodiment, provision is made that the at least one guidance element includes a plurality of individual bodies, which are connected among each other via at least one connection element. Preferably the individual bodies are each connected with each other via at least one connection element. Through an alteration of the length of the connection element, the bodies can be pulled apart or drawn together, wherein the bodies then, since they are all arranged in a circle, change their radial position, wherein the distance to the axis of symmetry is alterable. In a further configuration, provision is made that the at least one connection element consists of flexible material and surrounds a closed space that can be filled with a fluid. This fluid can be subject to excess pressure or negative pressure, so that motion in both directions is possible. This flexibility results in the required alteration in length. The totality of connection elements can then evoke a change in distance of the guidance elements to the axis of symmetry according to the principle of a corrugated bellows. Especially, multiple connection elements can enclose the closed space, i.e., these connection elements are jointly able to be filled with a fluid.

In one embodiment with the described connection elements, it is advantageous if the at least one guidance element is braced so as to be freely movable on a bracing element. This bracing element can in turn be directly or indirectly braced on an arrangement that is fixed relative to the machine room.

Provision can be made that the guidance surface be made available through at least one elastically deformable element. In this case it can be provided that the at least one guidance element carries the elastically deformable element and/or adjusts it in its dimensions. The advantage of an elastically deformable element is that through application of pressure, the guidance surface can be specifically deformed. In one advantageous further development, provision is made that the at least one elastically deformable element extends over multiple elements. In this case, the elastically deformable element can also make available a guidance surface at such locations at which no guidance element is found. Thus, in a certain way, it serves as a bridge over free spaces.

The object named above is also achieved through the features of claim 15. Accordingly a method is provided for calibration of a film tube, wherein the outer diameter of the film tube is adjusted through a gas pressure, especially through a gas excess pressure, in the interior of the film tube, wherein with at least one guidance element, to which at least one guidance surface is assigned, to which the outer surface of the film tube is facing, the outer diameter of the film tube is limited and the film tube is guided, wherein the film tube defines an axis of symmetry, wherein the distance of the guidance surface and/or of the guidance element to the axis of symmetry can be altered, wherein the film tube is guided by the calibrating device in the direction of gravity, and wherein, above or in the starting area of the at least one guidance element, a liquid reservoir is situated, from which the liquid is directed out of the liquid reservoir to the outer periphery of the film tube.

The advantages that are attained by the invention-specific method, correspond to those of the invention-specific device.

Further advantages, features and particulars of the invention are gleaned from the specification that follows, in which, while making reference to the figures, various embodiments are explained in particular. The features mentioned in the claims and in the specification can be essential to the invention either per se or in any combination. As part of the overall disclosure, various features and particulars, which are described in connection with the invention-specific method, are naturally also valid in connection with the invention-specific calibrating device and vice versa, so that in regard to the disclosure, reciprocal reference is also made to the individual aspects of the invention, or can be made. The individual figures show:

The individual figures show:

FIG. 1: a section through a calibrating device from prior art

FIG. 2: a section through an invention-specific calibrating device

FIG. 3: an embodiment of an annular body

Figure 4:
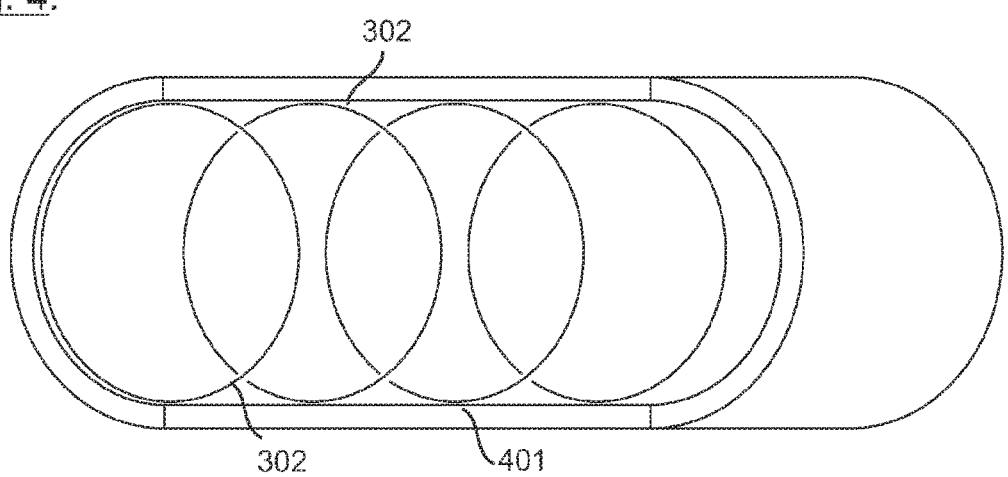

FIG. 4: a version of the annular body

Figure 5:
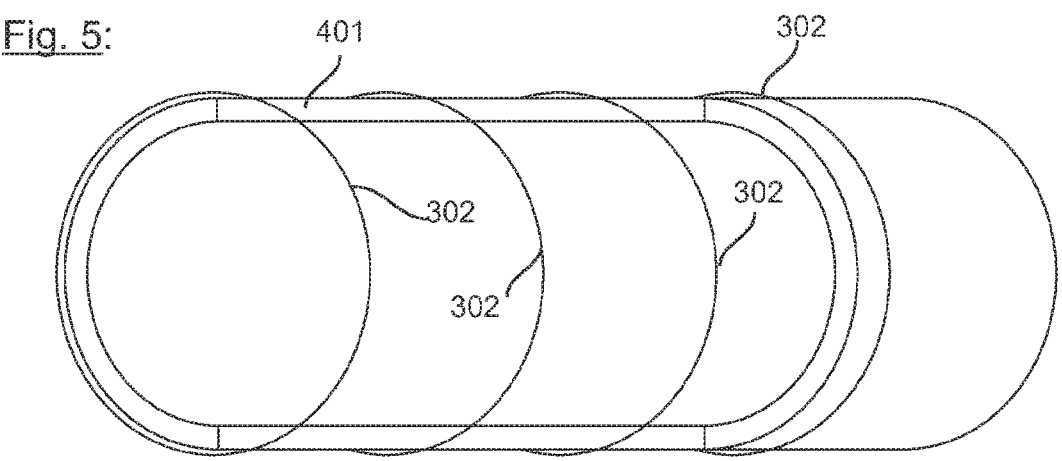

FIG. 5: another version of the annular body

Figure 6:
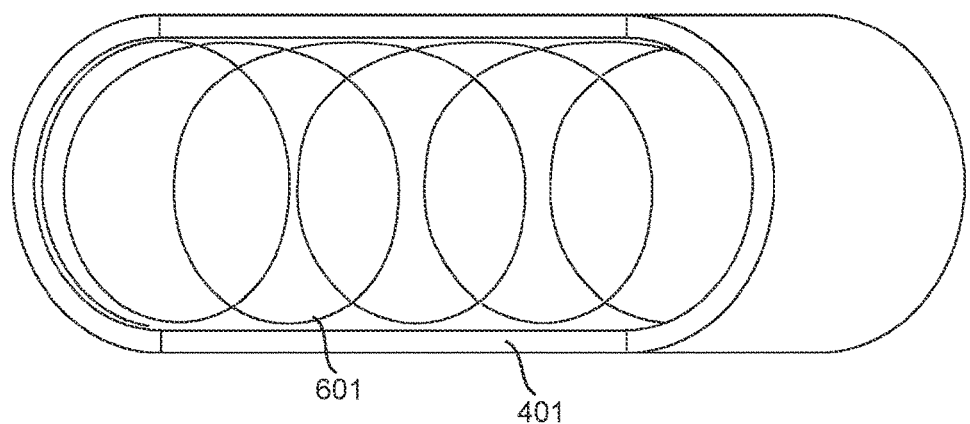

FIG. 6: another version of the annular body

Figure 7:
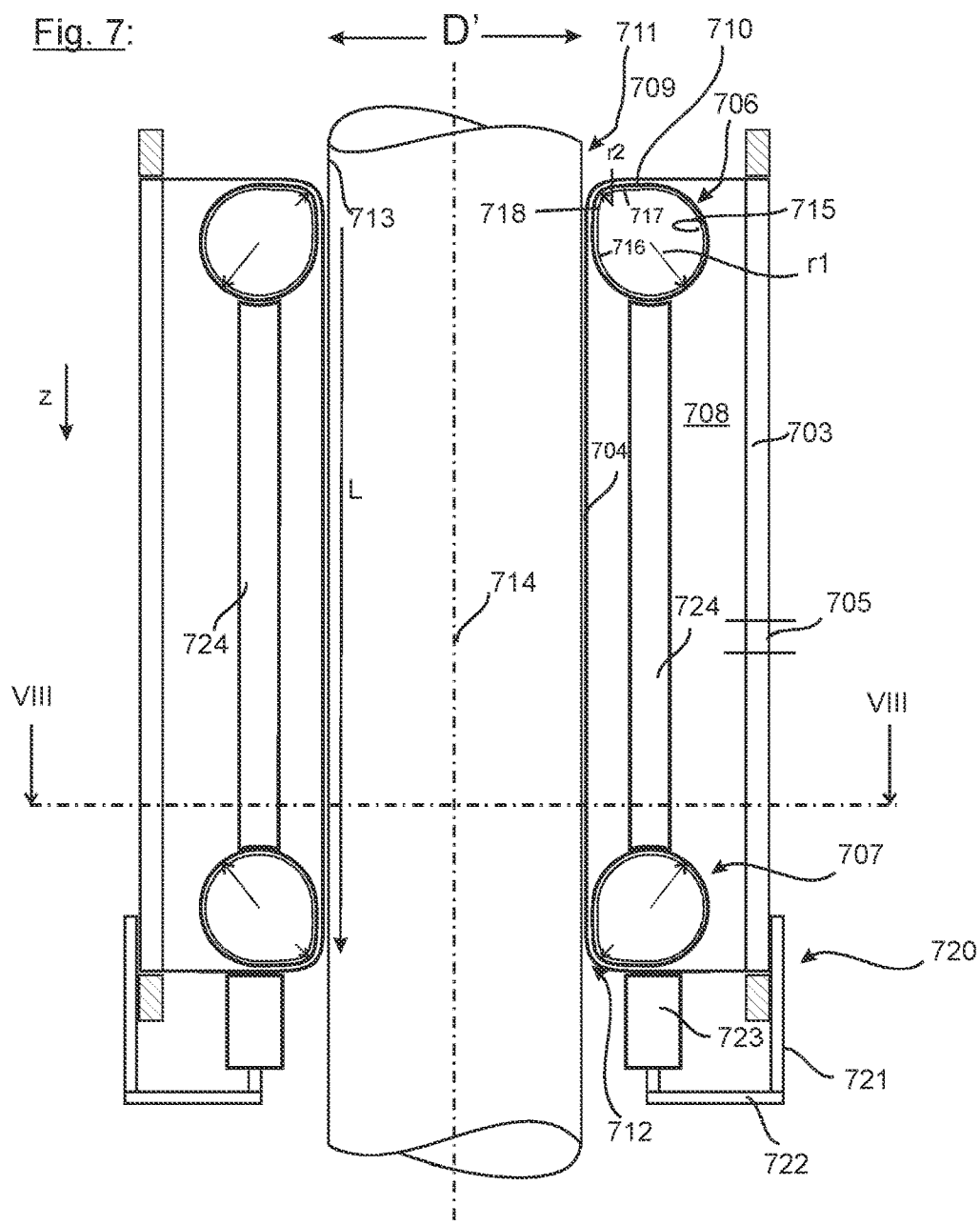

FIG. 7: another version of the invention-specific calibrating device

Figure 8:
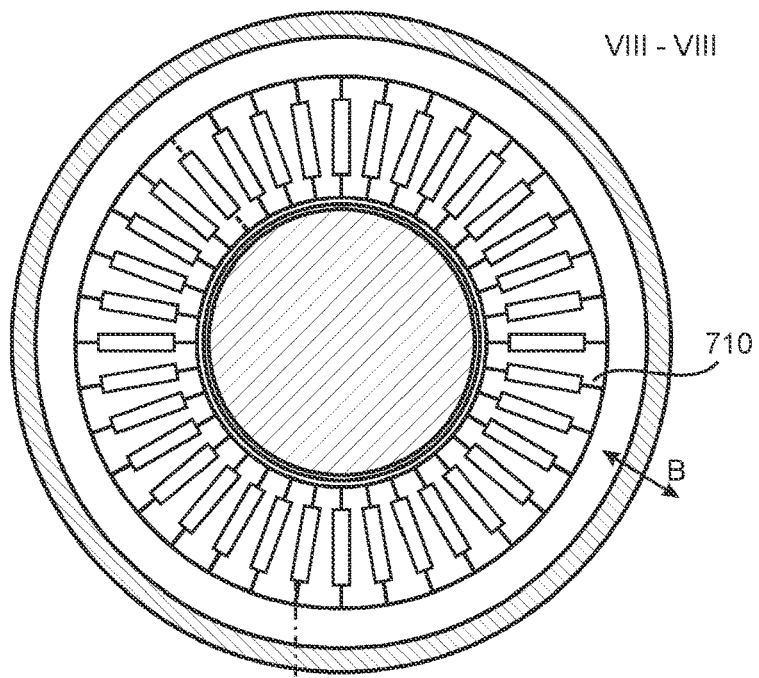

FIG. 8: the section VIII-VIII from FIG. 7

Figure 9:
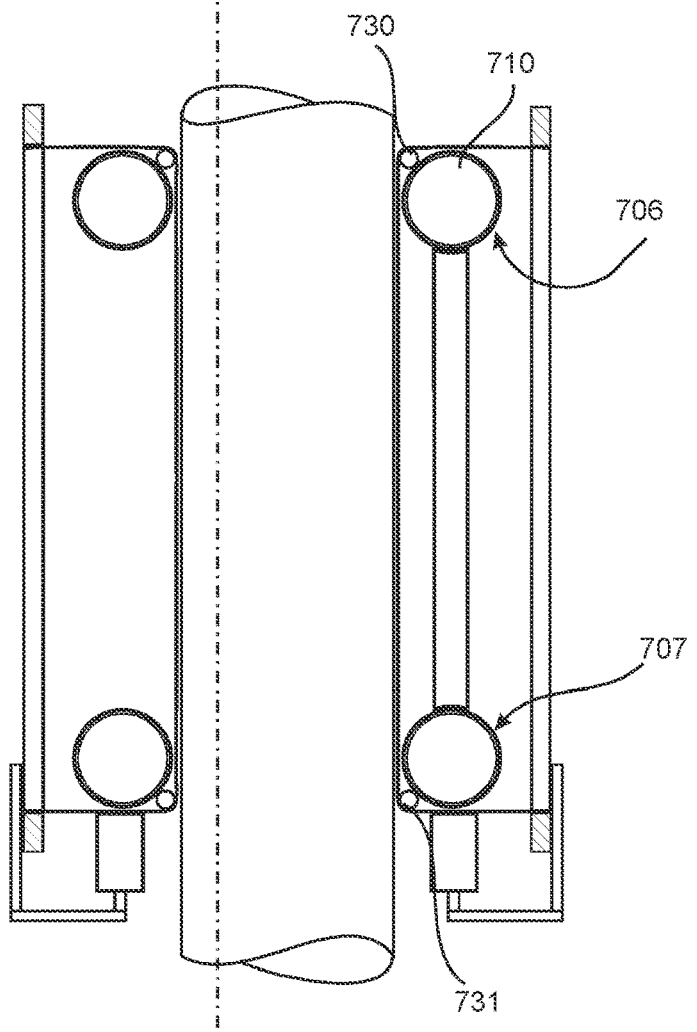

FIG. 9: another version of the invention-specific calibrating device

Figure 10:
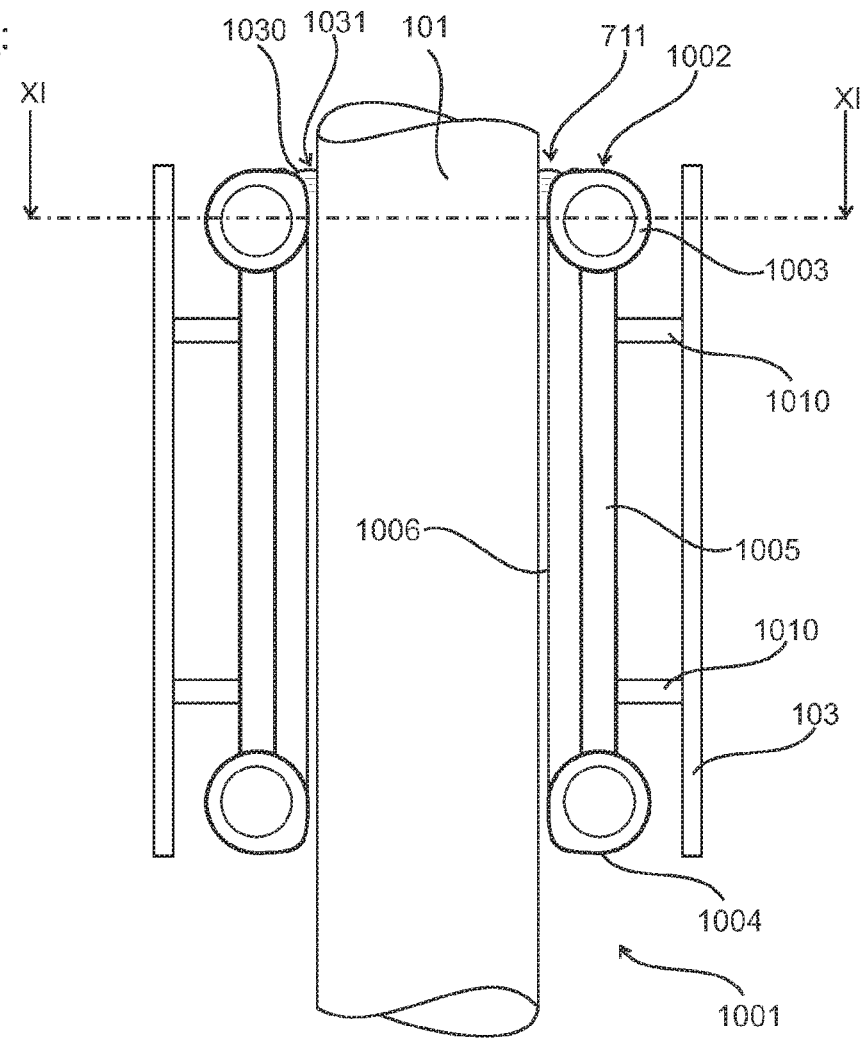

FIG. 10: another version of the invention-specific calibrating device

Figure 11:
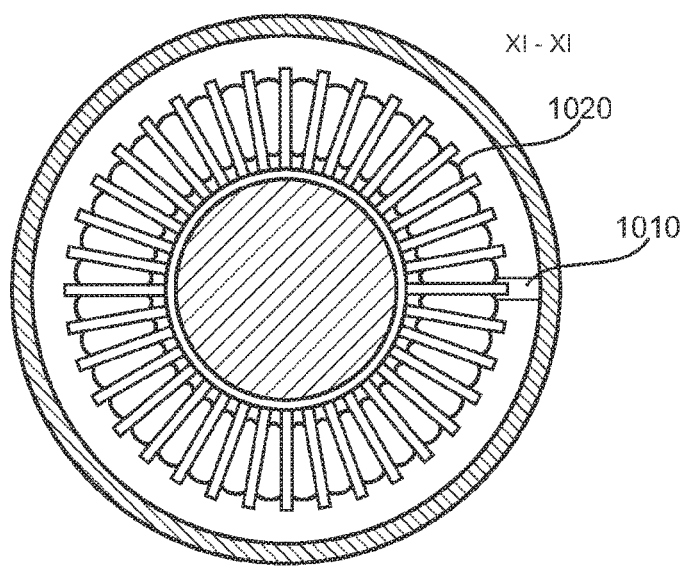

FIG. 11: view XI-XI from FIG. 10

Figure 12:
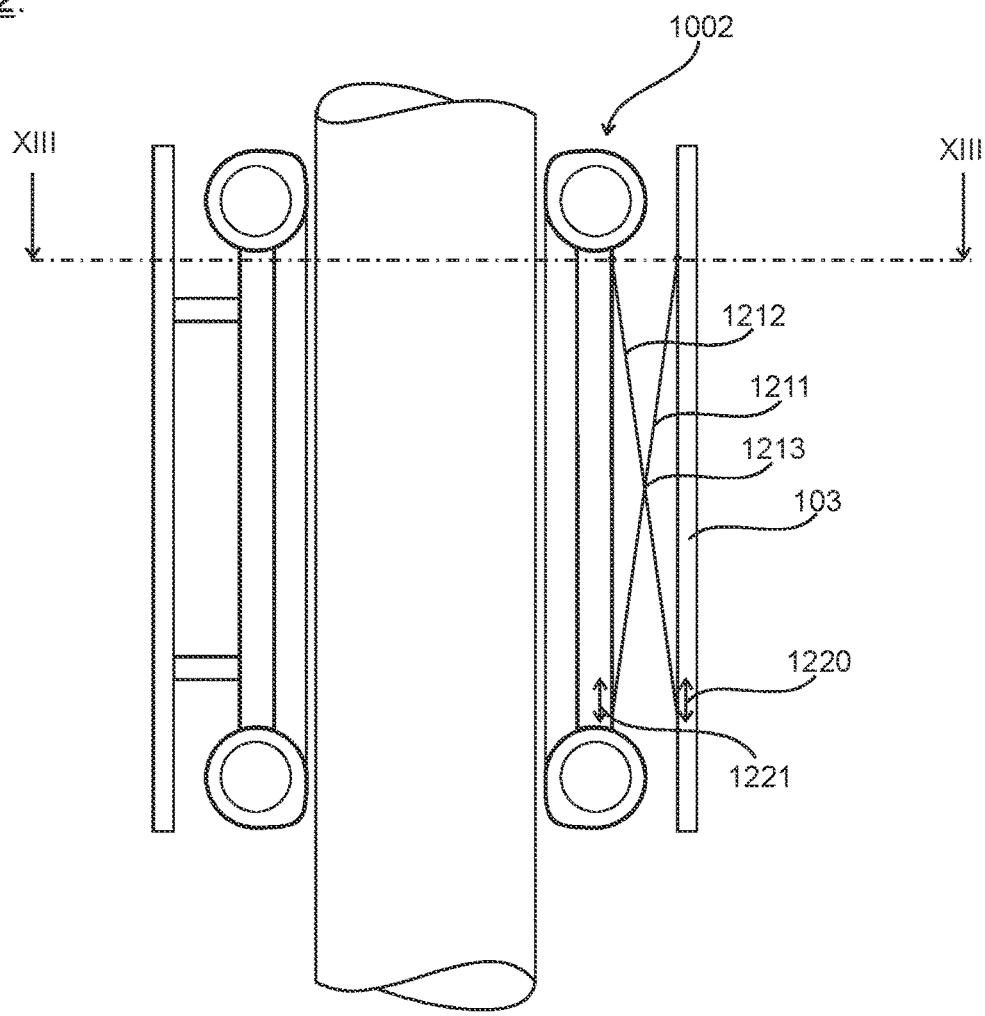

FIG. 12: another version of the invention-specific calibrating device

Figure 13:
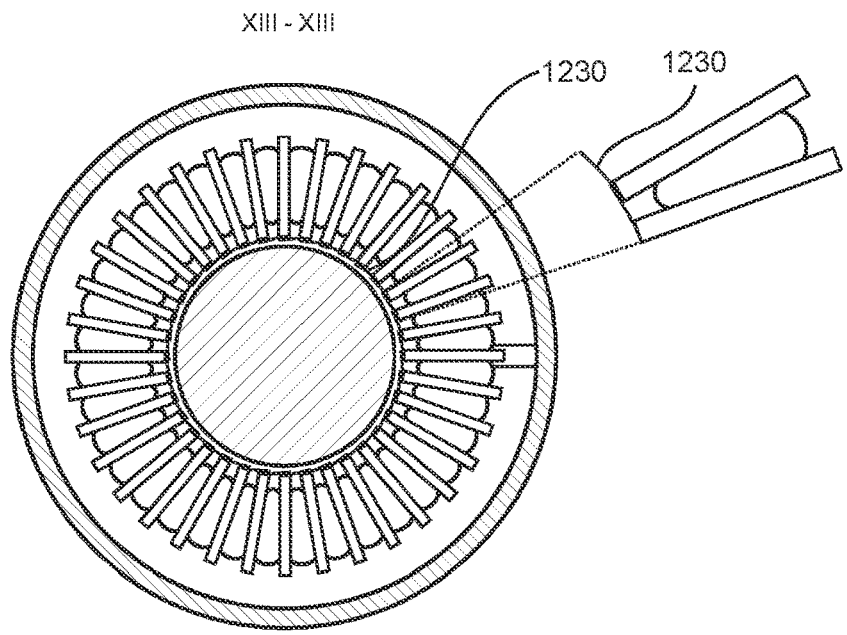

FIG. 13: view XIII-XIII from FIG. 12

FIG. 14: another version of the invention-specific calibrating device

FIG. 1 shows a section through a calibrating device, as it is known from WO 2012/032128. The film tube 101, which preferably is generated by a film tube extrusion device situated above the calibrating device 100, is withdrawn in transport direction z. Perceptible is the axis 102, which essentially represents the axis of symmetry of film tube 101. Film tube 101 itself has an outer diameter D. As a further element, the calibration device includes the sleeve 103, which advantageously consists of a solid material and can be shaped like a cylinder. The guidance and thus the calibration of film tube 101 assumes the elastically deformable element 104, the inner diameter D' of which is slightly more than the outer diameter D of film tube 101, so that between the film tube and elastically deformable element 104 a fluid film—preferably over the full surface—can be provided. A liquid, especially water, is preferably used as the fluid. However, the inner diameter can increase or decrease in the direction z, or be non-uniform, which will be described later in greater detail. Elastically deformable element 104 is arranged, preferably attached, on the sleeve. Advantageously the arrangement is done so that a fluid, such as a gas, especially air, cannot come out in uncontrolled fashion from the space 112 formed by the elastically deformable element and the sleeve. A fluid intake or exit is made available by the opening 105. The embodiments known from WO 2012/032128 A1 can be combined in advantageous fashion with the embodiments and features of the present application. Therefore, the entire content of WO 2012/032128 A1 is deemed as being incorporated into this present patent application.

In inlet region 106 and in outlet region 107 of film tube 101, annular bodies configured as tubes 108 and 109 are provided in calibration device 100, which in essence are rotationally symmetric to axis 102, with this axis not intersecting the bodies. In FIG. 1, each tube 108, 109 per se with a section of the sleeve surrounds a space 110, 111, which has no connection with space 112 formed by the sleeve and the elastically deformable element. Thus the volume and/or the interior pressure of spaces 110, 111 can be adjusted, independent of each other and also independent of space 112 by feeding in or draining out a fluid. The fluid in turn can here be a gas, especially air. The radius r describes the distance between axis 102 and the point lying closest to this axis or to the line lying closest of the annular body, wherein the radius r is the shortest connection, thus lying orthogonal to axis 102.

The guidance length L describes the section along which film tube 101 is effectively guidable by the elastically deformable body. This section in essence corresponds to the distance of the points or of the lines, respectively, of tubes 108, 109, which lie nearest axis 102. In the present example, this is the distance of the vertices of the two tubes 108 and 109.

It is perceived from FIG. 2 that with an enlargement of the desired diameter D of foil tube 101, not only the inner diameter D' is to be enlarged, but also the radius r, with the volume of spaces 110, 111 to be reduced. The position of the vertices of tubes 108, 109 does not change, so that guidance length L essentially remains constant. Nonetheless the cross section of the tubes changes, so that especially in the inlet region of the film tube another inlet situation is produced into the calibration device, which can have a special influence on film quality.

FIG. 3 shows a section 301 of an annular body, which can be installed in an invention-specific calibration device, in a perspective view. To illustrate the circular body, a circle 304 is depicted by a dashed line, the midline 305 of which intersects the line of symmetry 102. This annular body includes a multiple of a first component 302 arranged for example along the notional circle 304, which is a component that presets the contour or the cross-sectional shape. This component has an encircling element, approximately like a circular ring. These components that prescribe the contour are each arranged at a reciprocal distance, which preferably is constant, about the axis of symmetry to which each of them has an equal distance. Each two components are connected with each other, so that ultimately all the components are coupled with each other. Preferably each two neighboring components are connected in this way with each other. For connection, one or more elastic elements 303 are provided. Spring-loaded elements such as springs or rubber rods are conceivable to be the spring loaded elements. These elements 303 are depicted in simplified fashion in FIG. 3 as connection lines, which at the upper apex points act on surrounding elements depicted as circular rings. Nonetheless it should be emphasized that the elements can also act on other and/or more places on components 302 than these.

For diameter adjustment of the annular body, thus for variation of the distance r, for example mechanical drive media such as lever arms can be provided, which, for example, are able to be connected and pivoted on sleeve 103. The other ends of the lever can act on multiple, or on all, of components 302.

FIG. 4 discloses another advantageous version of the annular body, however with a section shown rolled up. With this the components 302 are connected with each other by a single tube 401, with this tube 401 surrounding components 302. The components 302 themselves are in turn depicted as circular rings, but are not limited to this embodiment. The components 302 can be connected in a suitable manner with the tube, for example by adhesive bonding. FIG. 5 shows a somewhat altered embodiment, in which the components 302 surround tube 401, which can yield advantages in terms of manufacturing. Here the components 302 can be adhesive-bonded from without onto already closed tube 401.

The design of the annular body as per FIGS. 4 and 5 has an advantage in that the components 302 in essence preset the cross section of the annular body, whereas in contrast the tube, by addition or removal of a part of the contained air volume increases or reduces the distance r. Going along with this, depending on the nature of the tube, it can somewhat increase or decrease its cross section between two components 302, which can however be lessened by provision of as high a number of components 302 as possible. In advantageous fashion, in this was many components 302 are provided, so that at the smallest distance r min between the annular body and axis of symmetry 102 along the closed line that lies closest to the axis of symmetry, the components nearly adjoin each other.

FIG. 6 shows a variation of the embodiment of FIG. 4, in which the individual components 302 are replaced by a spring 601, especially a tension spring. With this, each winding of the spring (a 360-degree revolution around the spring material) assumes the function of a single component 302. Providing a spring on the one hand facilitates assembly of the annular body, and what is achieved on the other hand is that the individual windings assume a unitary and constant distance to adjoining windings, which always be guaranteed with separate components 302, which are only connected with each other through the elastic element or elements. Similar to the embodiments in FIGS. 4 and 5, the springs can be arranged within tube 401 (as is depicted in FIG. 6), or be arranged around the tube, which is not shown, however.

If in an embodiment in which a spring surrounds a tube, or is surrounded by a tube, the distance between the axis of symmetry and the annular body is altered, then a change in the cross section of the annular body can be measured. The reason is to be found in that a spring, when it is pulled apart, has a somewhat smaller outer circumference and vice versa. The alterations of the body cross section of the annular body that occur due to this phenomenon are acceptable in practice and therefore do not change the concept of the present invention. Such embodiments are therefore to be viewed as falling under the patent claims.

Likewise with the embodiments described in FIGS. 4 to 6 it is true that the cross section of the annular body—as viewed in the peripheral direction of the axis of symmetry—can be changed continuously, especially periodically, since the individual components 302 or the windings of spring 601, which each are to be viewed as bracing points, have an interval and the tube in the intermediate regions can have a smaller diameter than right at the support points. Also these deviations from the ideal cross section of the annular body, constant over the entire periphery, are acceptable and especially able to be influenced by a suitable selection of materials and/or dimensions of the tube. Such deviations are also included in the invention concept and thus are to be seen as falling under the patent claims.

FIG. 7 shows a cross section of an embodiment of an invention-specific calibration device. On the sleeve 703 in turn the elastically deformable element 704 is attached in such a way that via the fluid attachment a fluid, especially a gas, preferably air, can be inserted or extracted in such a way that a certain pressure P1 and/or a certain volume V1 can be set at a given temperature in the space 708 enclosed by the sleeve and the elastically deformable element. The annular bodies 706 and 707 are situated within space 708 with a region of each elastically deformable element 704 carried by surface pieces of annular body 706, 707. The regions of elastically deformable element 704 that are carried by the annular bodies, are in the inlet region 711 and the outlet region 712 of the calibration device for film tube 713.

Annular bodies 706, 707 can correspond in regard to their design to one of the annular bodies that are disclosed using FIGS. 4 to 6. In the case of FIG. 7, the annular body includes a flexible tube 709, that surrounds multiple components 710, which serve as bracing elements. It is emphasized here that the components 710 likewise can be coils of a spring. As already described above, the components can also surround the tube. The components 710 are arranged along a circle, as will be explained in what follows with the aid of FIG. 8. One particular feature of support elements 710 is that its cross section deviates from a circular shape. With this, for example the periphery of this cross section can first include a circular arc 715 with the radius with this circular arc able to extend over an angle of up to 270 degrees. The straight lines 716, 717 can adjoin it, which preferably run parallel to the axis of symmetry 714 (in the case of straight line 716) or orthogonal to it (straight line 717). The two straight lines can for example be connected with each other by another circular arc 718, which can have a radius $r_2$, preferably with $r_2 < r_1$ being valid. It is to be emphasized that the circular arcs can consist of a number of circular arcs which have differing radii. Also, the periphery line of component 706 can be curved in another way, or also include straight sections. No limits are set to the shaping of the component. In the described design, parts of elastically deformable element 704 are in essence carried by straight lines 716 and 717 and circular arc 718.

Annular body 706 is able to be impinged on by a fluid, especially a gas, preferably air, in such a way that in its interior, at a given temperature, a pressure P2 and/or a volume V2 are set. Changing the volume by adding or withdrawing the fluid leads first of all to a change in the distance of annular body 706 to axis of symmetry 714, but possibly also to a simultaneous change in interior pressure P2. Annular body 707 can be impinged on by a fluid with a pressure P3 and/or a volume P3, with P2 and P3 being equal, but they can also be different. The same holds true for volumes V2 and V3.

The diameter D' of the calibration device can now be adjusted by feeding in a suitable fluid quantity, wherein the pressures P1, P2, P3 and volumes V1, V2 and V3 result. This can be clarified with an example in which P1 is the ambient pressure and the corresponding original diameter $D_{initial}$ is smaller than D'. If in this example the fluid amount in space 708 is reduced, then the volume is reduced, since the ambient pressure remains the same and thus P1 could likewise remain the same. Due the volume reduction, the diameter increases to D' To also make the inlet and outlet area reach diameter D', the fluid amounts in annular bodies 706 and 707 must now be increased, so that their volumes V2 and V3 become larger. But since the cross section cannot change, or only minimally, this measure has an effect on the distance between axis of symmetry 714 and annular bodies 706, 707, with this distance becoming greater. The guidance length L remains essentially unchanged with this.

The annular bodies are held by a bracing structure 720 in their positions relative to sleeve 703, so that they do not move, or move opposite direction z, and also remain symmetric to axis of symmetry 714. For this the bracing structure can initially include a projection 721, on which bracing elements 722 are attached, directed radially inward, which are adaptable to the inner diameter of elastically deformable element 704. For this, bracing elements 722 can be configured to be pivotable or be designed in the manner of shears handles. On these bracing elements carriers 723 are braced, on which the annular body 707 braces.

Annular body 706 now is braced via spacers 724 on annular body 707, whereby preferably a spacer 724 is assigned to each component 710. This situation is seen more clearly in FIG. 8, which the section VIII-VIII in FIG. 7 shows. In this figure, additionally the components 710 arranged on a circle are perceived. The dual arrow designated by the letter B indicates the radial direction of motion in which the affected component 710 is movable when diameter D is changed.

FIG. 9 shows an embodiment altered relative to FIG. 7, in which annular bodies 706, 707 again surround components 710, which in essence have a circular cross section. To nonetheless obtain an inlet and outlet area with small inlet and outlet radii, a tube 730 and 731 is attached on each of annular bodies 706 and 707, the volumes of which preferably are considerably smaller, especially a maximum of 0.25 of the volume of the annular body. The tube 730, 731 can be securely connected on body 706 or 707, for example by an adhesive connection. Alternative to that, or in addition, both elements 706, 730 or 707, 731 can be provided with surrounding elements such as a sleeve tube or sleeve tube pieces. The tubes 730, 731 can be simple, annular-arranged tubes. However, they can also be configured after the example of annular bodies, as they have already been described in various alternatives. In addition, instead of one tube, also multiple tubes can be provided, which can have differing cross-sectional sizes.

FIGS. 10 and 11 show yet another version of an invention-specific calibration device 1001. Film tube 101 is here guided by a plurality of guidance elements 1002, which are arranged to form an annulus. Each guidance element 1002 includes an intake element 1003, which is a component part of intake region 711. In other words, the plurality of intake elements forms intake region 711. Additionally, each guidance element 1002 includes an outlet element 1004. In the embodiment shown, inlet element 1003 and outlet element 1004 have a cross section that deviates from a circular form, as has already been explained in connection with FIG. 7. However, inlet and outlet elements 1003, 1004 are preferably made from a solid material, i.e., especially the cross section does not change upon application of force, as long as this force application does not lead to elements 1003, 1004 being destroyed.

An inlet element 1003 and the pertinent outlet element 1004 are connected with each other by a connection element 1005, with the inlet element 1003, the connection element 1005 and the outlet element 1004 even able to be configured as a single piece, which may lead to a simplification of the manufacturing process. In addition, the elements named can be molded or injection-molded as a plastic part.

Between each inlet element 1003 and the pertinent outlet element 1004, a planar element 1006 can be provided, which is to be viewed as a guidance surface of guidance element 1002, since it faces toward film tube 101 and guides same. Planar element 1006 can also coincide connection element 1005, i.e. they can immediately adjoin one another or even form one component.

At least one part, or also all the guidance elements 1002 are individually braced via bracing elements 1010 on sleeve 103. These bracing elements 1010 can be sliding bearings which make it possible to shift guidance elements 1002 in the radial direction. For this, guidance element 1002 in question lies for example with a projection piece not shown on bracing element 1010.

Further perceived in particular in FIG. 11 is that the individual guidance elements 1002, especially the individual inlet elements 1003 are connected with each other via tube pieces 1020. With this a tube piece 1020 can be attached with both its ends on a guidance element 1002, especially on an inlet element 1003, with the attachment preferably being fluid-sealed. In addition, the inlet element can have an opening 1006, so that each two tube pieces 1020 can be in fluid-communicating contact through this opening 1006. The totality of tube pieces 1020 can also form a tube that extends through the openings 1006. The tube pieces 1020 or the tube preferably consist of a flexible material, but not an elastic material. Thus the tube pieces 1020 or the tube can act like a type of corrugated bellows. Tube pieces 1020 or an already mentioned tube can also naturally be in contact with outlet elements 1004 in the same way. The tube pieces 1020 and guidance elements can be configured as a single piece or at least be formed from the same material. The particular wall thicknesses are what determines whether the individual elements are flexible or solid in this case. One suitable manufacturing process for this is 3D printing.

Admission of a fluid into tube pieces 1020 or into the tube will cause two adjoining guidance elements to assume a distance to each other that increases. This functions simultaneously with all the guidance elements only if thereby a distance that becomes greater is assumed to the axis of symmetry of the film tube. By this the guidance diameter for film tube 101 can be adjusted in a simple manner. It can, for example by giving support to an increased inner pressure, assume a larger radius. Conversely, by removal of fluid with which the tube pieces or the tube are filled, the distance of guidance elements 1002 to axis of symmetry 714 of film tube 101 is reduced. Since all guidance elements 1002 are configured the same, and also the tube pieces have the same properties, there always results a circular arrangement of guidance surfaces, so that the film tube is guided along an approximately circular or cylindrical form.

The liquid 1030 from the liquid reservoir 1031 can now get between planar element 1006 and film tube 101, to thus supply the necessary cooling for film tube 101 and to form a friction-reducing film between film tube 101 and planar element 1006.

So that not too much liquid is diverted, between every two guidance elements 1002, curtains that are not shown are provided, which prevent a penetration of liquid through the free space between guidance elements 1002.

FIGS. 12 and 13 show a variation of the calibration device shown in FIGS. 10 and 11, in which bracing elements 1010 have been replaced by bracing elements 1210. These bracing elements 1210 are configured in the manner of shears handles and include two levers 1211, 1212. Lever 1212 is connected in articulated fashion by its upper end with guidance element 1002, while lever 1211 is connected in articulated fashion with its upper end on sleeve 103. The lower ends of levers 1211 and 1212 are attached in articulated fashion on sliding bearings, which however are not shown, but the direction of motion of which is shown by dual arrows 1220 and 1221. A drive for the sliding bearings is not necessary if, as is clarified in connection with FIGS. 10 and 11, the guidance elements are shifted radially via addition or removal of a fluid into or out of the tube pieces or the tube. Instead of this, or in addition, a radial shift can be carried out by a motorized drive of at least one of the sliding bearings. With this, for example, the sliding bearing assigned to dual arrow 1220 can be shifted by a motor and a gear element. Shifting upwards, thus against the direction of film tube transport, virtually results to an opening of the shears and thus to a shift of guidance elements 1002 in a radial direction toward the axis of symmetry of the film tube.

FIG. 13 not only shows the view XIII-XIII from FIG. 12, but additionally another embodiment version. Accordingly on each guidance element 102 one or more lamellae 1230 can be arranged, which at least partially cover at least the lamella or the lamellae of one or more adjoining guidance elements. With this it is possible to make available a largely homogeneous cylindrical shape for guidance of the film tube. Where one lamella ends in the peripheral direction, inevitably a step is present, thus a mismatch in the radial direction. With this, a mismatch is less than 5 mm, especially less than 1 and preferably less than 0.5 mm. The dashed lines lead to an enlarged inset, from which the lamellae are better seen.

FIG. 14 shows a further embodiment of the invention, in which the guidance element is formed from a flexible element 1401, which is especially configured to be beltlike. For example, a steel belt is provided. Flexible element 1401 is arranged in a spiral shape, so that after each coil, the element 1401, seen in the transport direction, is above or below the previous coil. What is achieved by that is that the flexible element is arranged to be free of overlaps, and approximately forms a cylinder.

So that the described shape is maintained, about the flexible element multiple braces 1402 are arranged, which provide a counterforce directed inward for flexible element 1401, which is under tension in such a way that it attempts to get uncoiled again. The braces 1402 are braced on a holding element not shown, for example a sleeve, especially a metal sleeve. Between the holding element and brace in addition at least one actuator element is provided, by which individual braces, or all braces, can be shifted in the radial direction or against the radial direction. This is indicated by the dual arrows 1403. The end 1404 of flexible element 1401 is attached onto one of the braces 1402.

If the braces 1402 are now shifted, the flexible element must be guided past on the braces in the peripheral direction. For this, rollers 1405 can be provided, which serve to minimize friction and ultimately year. The movement of flexible element 1401 is made clear by the dual arrows 1406. With a periphery that becomes smaller, the result is a need to collect flexible element 1401 outside the calibration device. Serving for this is the roller 1407, which deflects the flexible element in such a way that it can be stored outside the calibrating device. For this, flexible element 1401 can be wound up on a coil 1408.

| List of reference symbols | |
|---|---|
| 100 | Calibration device |
| 101 | Film tube |
| 102 | Axis, symmetry axis |
| 103 | sleeve |
| 104 | Elastically deformable element |
| 105 | opening |
| 106 | Inlet region |
| 107 | Outlet region |
| 108 | tube |
| 109 | Tube |
| 110 | space |
| 111 | space |
| 112 | space |
| 301 | Section of an annular body |
| 302 | component |
| 304 | circle |
| 305 | Midpoint of the circle |
| 401 | tube |
| 601 | spring |
| 703 | sleeve |
| 704 | Elastically deformable element |
| 706 | Annular body |
| 707 | Annular body |
| 708 | space |
| 710 | component |
| 711 | Inlet area |
| 712 | Outlet area |
| 713 | Film tube |
| 714 | Symmetry axis |
| 715 | Circular arc |
| 716 | Straight line |
| 717 | Straight line |
| 718 | Circular arc |
| 720 | Bracing structure |
| 721 | projection |
| 722 | Bracing element |
| 723 | carrier |
| 724 | spacer |

-continued

| List of reference symbols | |
|---|---|
| 730 | tube |
| 731 | tube |
| D | Outer diameter |
| D' | Inner diameter |
| L | Guidance length |
| P1, 2, 3 | pressure |
| R, r1, r2 | radius |
| V1, 2, 3 | volumes |
| Z | Transport direction |

The invention claimed is:

1. A calibrating device for calibration of a film tube, which has an outer diameter, which is adjustable by an excess gas pressure in the interior of the film tube, comprising at least one guidance element and at least one guidance surface, wherein the at least one guidance element comprises an inlet element and an outlet element, wherein each of the inlet and outlet element comprises a plurality of encircling elements connected among each other by one or more elastic elements and is connected to one or more support elements is provided, to which the at least one guidance surface is assigned, which the outer surface of the film tube faces, and which limits the exterior diameter of the film tube and guides the film tube in a region which has a guidance length, wherein each encircling element is made from a solid material possessing a thickness that prevents the cross-sectional shape of the inlet and outlet elements from changing under an application of force that does not lead to the inlet and outlet elements being destroyed, wherein the film tube defines an axis of symmetry, wherein the distance of the at least one guidance surface and/or of the at least one guidance element to the axis of symmetry is alterable by the one or more support elements, wherein the film tube is guidable by the calibrating device in the direction of gravity, wherein above, or in an inlet region of the at least one guidance element, a liquid reservoir is situated, wherein the liquid is able to be directed out of the liquid reservoir to the outer periphery of the film tube, wherein the film tube is surrounded by a closed liquid film, and wherein the guidance length is adjusted or constant, independent of the distance of the guidance surface and/or of the guidance element to the axis of symmetry.

2. The calibrating device of claim 1, wherein the at least one guidance element makes available a cylindrical, barrel-shaped or conical area for the film tube.

3. The calibrating device of claim 1, wherein the distance of the at least one guidance element to the axis of symmetry in the radial direction is adjustable.

4. The calibrating device of claim 1, wherein the at least one guidance element includes a plurality of guidance elements which are adjustable in their distance to the axis of symmetry.

5. The calibrating device of claim 1, wherein the at least one guidance element extends essentially parallel to the transport direction of the film tube.

6. The calibrating device of claim 1, wherein the one or more elastic elements
consists of elastic material and surrounds a closed space that can be filled with a fluid.

7. The calibrating device according to claim 1, wherein the one or more support elements are comprised of springs.

8. The calibrating device according to claim 1, wherein the one or more support elements are comprised of sliding bearings.

9. The calibrating device according to claim 1, wherein the one or more support elements are comprised of levers.

10. The calibrating device of claim 1, wherein the at least one guidance element and the at least one guidance surface, when viewed in the transport direction, at the start of the calibration device, form an inlet region with a cross section that diminishes in the transport direction.

11. The calibrating device of claim 10, wherein the inlet region in cross section has at least in part a circular arc shaped cross section.

12. The calibrating device of claim 10, wherein the cross section is adjustable or constant, independent of the distance of the at least one guidance surface and/or of the at least one guidance element to the axis of symmetry.

13. The calibrating device of claim 12, wherein a static liquid ring is provided in the inlet region for formation of the liquid reservoir.

14. The calibrating device of claim 1, wherein the at least one guidance surface is made available via at least one elastically deformable element.

15. The calibrating device of claim 14, wherein the at least one elastically deformable element extends over multiple guidance elements.

16. A method for calibrating a film tube, wherein the outer diameter of the film tube is adjusted by an excess gas pressure in the interior of the film tube, wherein the film tube is calibrated using at least one guidance element and at least one guidance surface, wherein with the at least one guidance element comprising an inlet element and an outlet element, wherein each of the inlet and outlet elements comprises a plurality of encircling elements connected among each other by one or more elastic elements and is connected to one or more support elements, to which the at least one guidance surface is assigned, which the outer surface of the film tube faces, the exterior diameter of the film tube is limited and the film tube is guided in a region which has a guidance length, wherein the each encircling element is made from a solid material possessing a thickness that prevents the cross-sectional shape of the inlet and outlet elements from changing under an application of force that does not lead to the inlet and outlet elements being destroyed, wherein the film tube defines an axis of symmetry, wherein the distance of the at least one guidance surface and/or of the at least one guidance element to the axis of symmetry is alterable by the one or more support elements, wherein the film tube is guided by the calibrating device in the direction of gravity, wherein above, or in an inlet region of the at least one guidance element, a liquid reservoir is situated, from which the liquid is directed out of the liquid reservoir to the outer periphery of the film tube, wherein the film tube is surrounded by a closed liquid film, and wherein the guidance length is adjusted or constant, independent of the distance of the guidance surface and/or of the guidance element to the axis of symmetry.

17. The method according to claim 16, wherein the one or more support elements are comprised of springs.

18. The method according to claim 16, wherein the one or more support elements are comprised of sliding bearings.

19. The method according to claim 16, wherein the one or more support elements are comprised of levers.

* * * * *

UNITED STATES PATENT AND TRADEMARK OFFICE
CERTIFICATE OF CORRECTION

PATENT NO. : 11,077,599 B2  
APPLICATION NO. : 15/580530  
DATED : August 3, 2021  
INVENTOR(S) : Jens Goldenstein Page 1 of 1

It is certified that error appears in the above-identified patent and that said Letters Patent is hereby corrected as shown below:

In the Specification

Please replace "The other ends of the lever" with -- The other ends of the lever arms -- (Column 6, Line 43);

Please replace "which always be guaranteed" with -- which cannot always be guaranteed -- (Column 7, Line 12);

Please replace "Planar element 1006 can coincide connection element 1005" with -- Planar element 1006 can coincide with connection element 1005 -- (Column 9, Lines 43-44); and Please replace "minimize friction and ultimately year" with -- minimize friction and ultimately wear -- (Column 11, Line 25).

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*